3,495,480
United States Patent Office
Patented Feb. 17, 1970

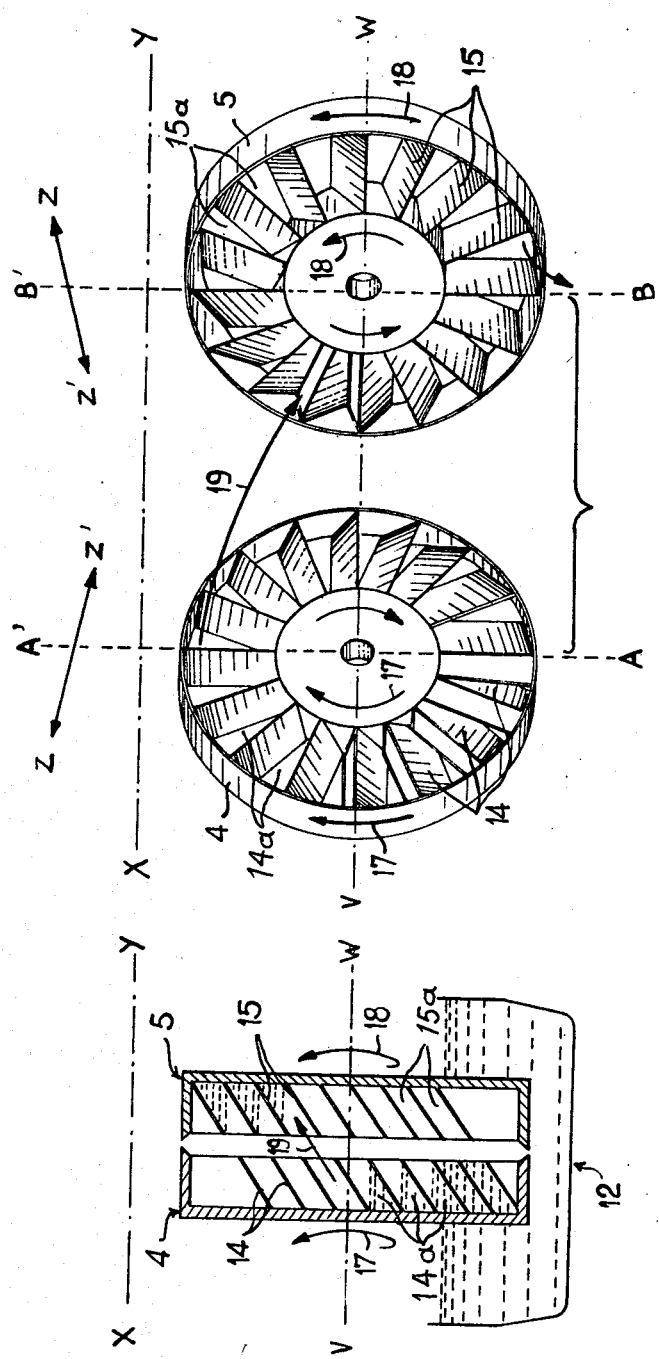

3,495,480
HYDROKINETIC TORQUE CONVERTER
Bernard Louis Guy Ruaud, 22 bix Rue Anatole France,
Vincennes, Val-de-Marne, France
Filed June 28, 1968, Ser. No. 740,988
Int. Cl. F16h 3/74
U.S. Cl. 74—752   7 Claims

ABSTRACT OF THE DISCLOSURE

A torque converter having an input shaft which orbits two planetary elements connected by a hydraulic fluid; one of the elements, by virtue of its rotation, imparts kinetic energy to the fluid which is converted to mechanical energy for rotating the other element which, in turn, causes rotation of an output shaft.

OBJECT AND SUMMARY OF THE INVENTION

An object of the invention is to provide an improved torque converter for obtaining a gradual, continuous and automatic change of ratio between an input and an output torque.

Briefly stated, according to the invention there is provided a torque converter which has a stationary housing, an input shaft having a main axis, an orbiting shaft fixedly secured to said input shaft in a laterally spaced relation and having a planetary axis, a planetary assembly formed of two axially aligned planetary elements each rotatably mounted on said orbiting shaft, a mobile housing enclosing said planetary assembly and orbiting therewith about said main axis. The mobile housing contains hydraulic fluid which operatively interconnects the two planetary elements. Mechanical connection is provided between one of said planetary elements and an output shaft on the one hand and between the other of said planetary elements and said stationary housing. Said connections cause said planetary elements to rotate about said planetary axis. In operation, one of the planetary elements imparts kinetic energy to the fluid which is converted to mechanical energy for rotating the other element which thus rotates the output shaft.

The invention will be better understood and further objects as well as advantages will become more apparent from the ensuing detailed specification of a preferred, exemplary embodiment taken in conjunction with the drawings.

BRIEF DESCRIPTION OF THE DRAWINGS

FIG. 3 is a diagram in section and side elevation illustrating the function of buckets formed by inclined vanes in the planetary elements; and FIG. 4 is a perspective schematic and exploded view of the planetary elements.

DESCRIPTION OF THE PREFERRED EMBODIMENT

Figure 1:
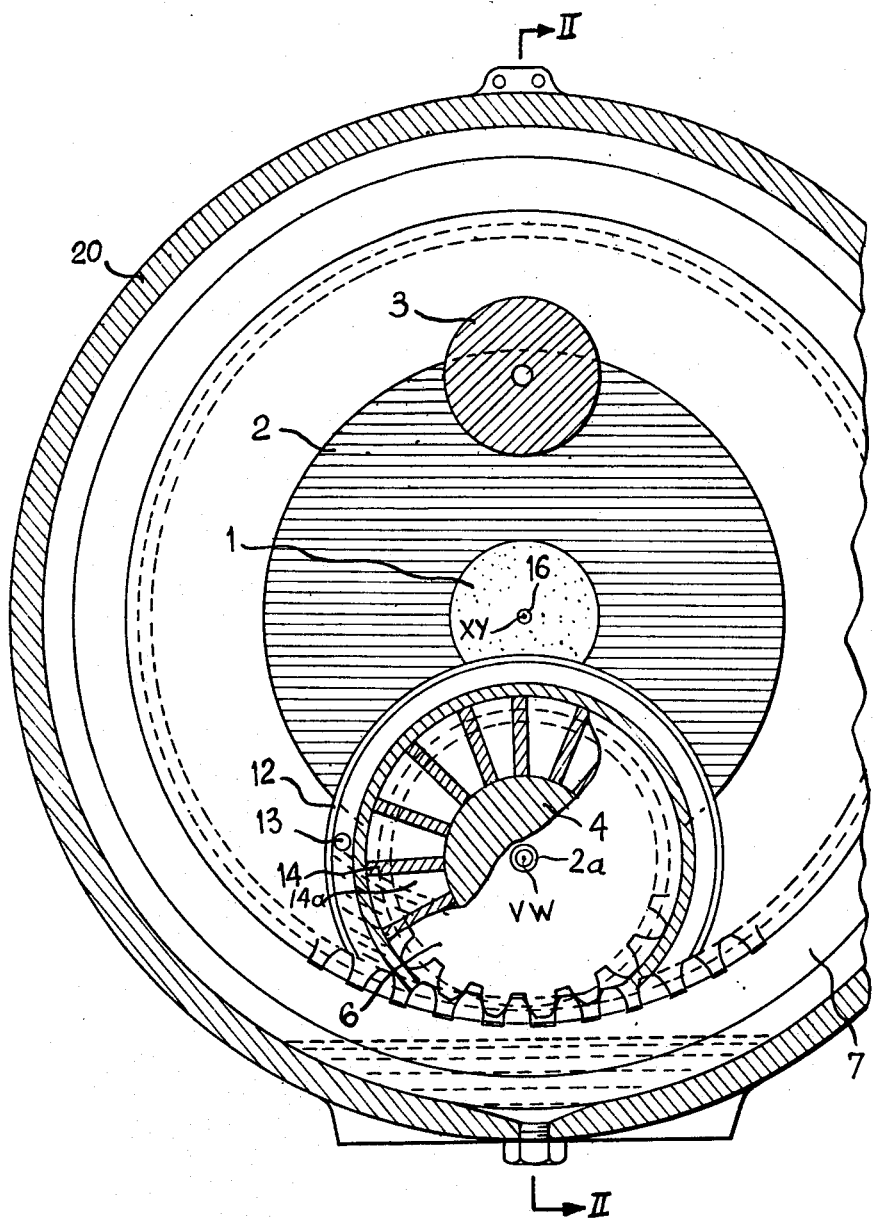
FIG. 1 is a sectional front elevational view of the preferred embodiment of the torque converter according to the invention.
Figure 2:
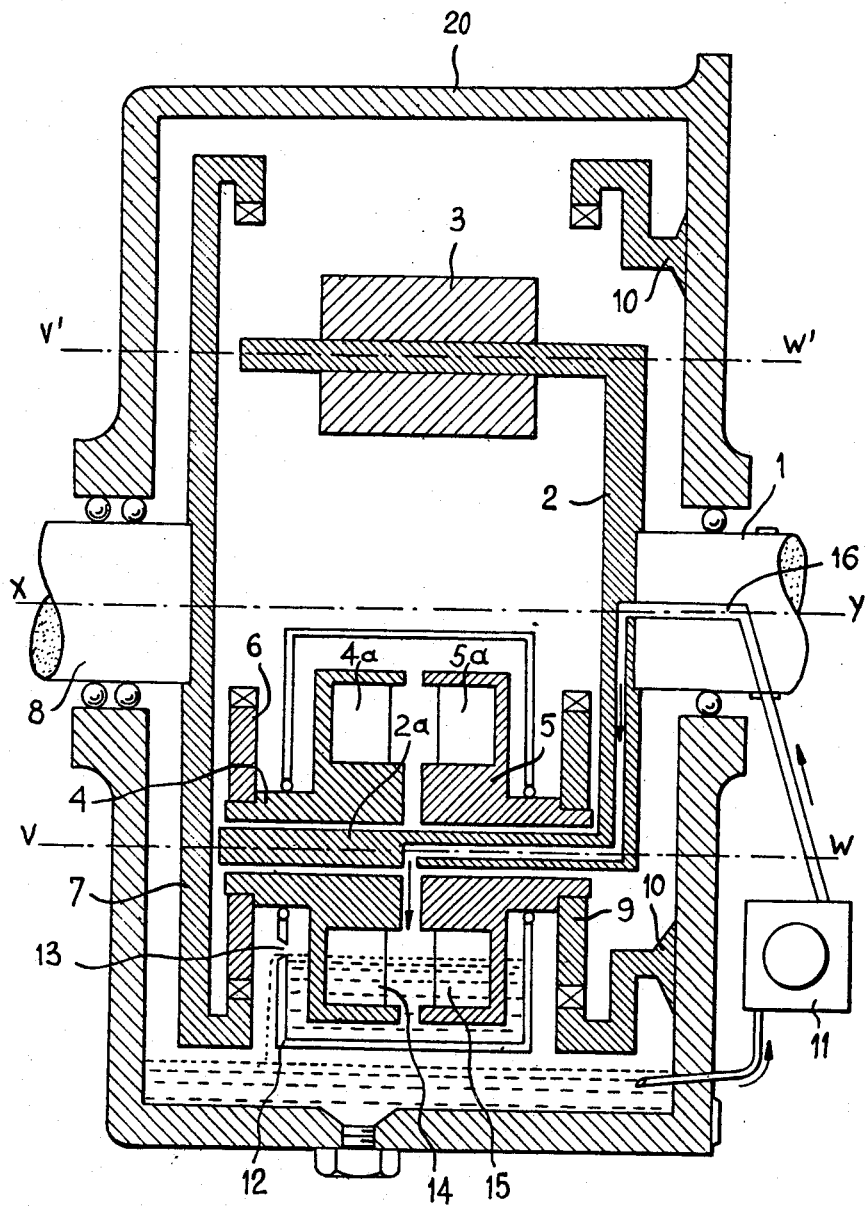
FIG. 2 is a sectional view taken along line II—II of FIG. 1.

Turning now to FIGS. 1 and 2, coaxially with the main axis XY of the converter there is disposed an input shaft 1 to which there is keyed an orbital carrier 2 including a counterweight 3.

To the orbital carrier 2 there is fixedly secured an orbital shaft 2a laterally spaced from input shaft 1 and having a planetary axis VW. On orbital shaft 2a there is rotatably mounted a planetary assembly comprising two planetary elements 4 and 5 disposed in an axially spaced, face-to-face relationship.

To the planetary element 4 there is keyed a pinion 6 which meshes with a ring gear 7 rigidly affixed to the output shaft 8 of the converter.

To the planetary element 5 there is keyed a pinion 9 which meshes with a ring gear 10 rigidly affixed to the stationary housing 20 of the converter.

A rotary pump 11 delivers fluid, preferably liquid, through a conduit 16, provided in shaft 1, carrier 2 and shaft 2a, into a mobile housing 12 surrounding the planetary assembly and orbiting therewith. A branch (not shown) of conduit 16 is provided for the lubrication of the shafts and gears. The fluid quantity contained in the mobile housing 12 is limited by an overflow opening 13.

The facing surfaces of the two planetary elements 4 and 5 are each provided with an annular recess 4a, 4b, respectively, in which there are radially disposed a plurality of respective vanes 14 and 15. The plane of each vane 14, 15 is at an angle with respect to axis VW. Vanes 14 and 15 define a plurality of buckets 14a and 15a disposed respectively in planetary elements 4 and 5 (FIGS. 4 and 5). FIG. 4 shows the inclination of impellers 14 of element 4 and impellers 15 of element 5 with respect to their direction of rotation indicated by arrows 17 and 18.

EXAMPLES OF POSSIBLE MODIFICATIONS IN THE STRUCTURE OF THE PREFERRED EMBODIMENT

The aforedescribed structure of the preferred embodiment may be modified in a great number of ways without departing from the scope of the invention.

The modifications enumerated below are given merely by way of example.

Thus, the counterweight 3 may be replaced by one or several planetary assemblies similar to the one described hereinabove and arranged in a circular array at regular intervals to provide a dynamic equilibrium. A planetary assembly replacing counterweight 3 would have a planetary axis V'W'. The element 5 may be connected to its pinion 9 by means of a free wheel system.

Also, the axis VW may be arranged in a plane which is not parallel to the principal axis XY.

Further, the annular recesses in the planetary elements 4 and 5 may be semi-toroidal and may be partitioned by planar or arcuate vanes which may be radial or non-radial or the recesses may be formed as appropriately oriented buckets.

The gears may be replaced by chains and pinions or belts and pulleys.

The output shaft could be arranged concentrically with the input shaft on the same side of the converter.

The ring gears 7 and 10 could each be replaced respectively by a central pinion keyed to the shaft 8 and to the stationary housing 20 and meshing by means of a series of pinions with gears 6 and 9 in such a manner that the latter rotate about the planetary axis VW in the same direction as described hereinbefore.

Also, instead of a liquid, the coupling fluid may be a powder.

OPERATION OF THE EMBODIMENT

The operational principles of the invention will now be discussed with particular reference to the aforedescribed preferred embodiment.

As the input shaft 1 starts to rotate driven by a motor (not shown), it also moves carrier 2 and the planetary assembly, with pinion 6 of element 4 meshing with ring gear 7 and pinion 9 of element 5 meshing with ring gear 10. At the start, the output shaft 8 is stationary and the two elements 4, 5 rotate in the same direction (arrows 17, 18) about the planetary axis VW, opposite to the direction of rotation of input shaft 1.

The motion of both planetary elements 4 and 5 is analogous to a small circle rolling without slippage on the inside circumference of a large circle. Each point on the periphery of a planetary element contacts its respective ring gear by describing a trajectory tangential to the diameter of said ring gear passing through the point of contact. This trajectory is rectilinear if the ratio of the diameter of the ring gear to the diameter of the element equals 2, but is incurvated if the said ratio is larger than 2.

The speed of one point on the periphery of a planetary element along the trajectory varies between a zero value at the contact points with the ring gear and a maximum value at a location on the trajectory that is closest to the center of the ring gear.

Thus, for each peripheral point on a planetary element the speed increases on the portions of the trajectory travelled from a point of contact with the ring gear to a point that is the closest to the center thereof and decreases on those portions of the trajectory travelled from the last-named point to a subsequent point of contact with the ring gear.

As the mobile housing 12 orbits about the main axis XY, the fluid, forced into the housing 12 by pump 11, is submitted to a centrifugal force which tends to move it away from the axis XY. Thus, the fluid is confined to a cylindrical segment of the mobile housing which has a maximum eccentricity with respect to axis XY. As a result, the parts of the two planetary elements which are the most remote from the axis XY are submerged in the fluid.

Referring now to FIGS. 3 and 4, the buckets 14a of the first planetary element 4 are disposed in such a manner as to collect the fluid in the peripheral zone A which is the most eccentric of the mobile casing 12 and to hold it until a point which is the closest to the respective ring gear during the acceleration on the trajectory. The buckets 15a of the second planetary element 5, on the other hand, are disposed in such a manner as to receive fluid from buckets 14a at B′ which is closest to the center of the ring gear and hold it as far as the periphery of the trajectory of the mobile casing; that is, to hold the fluid during the deceleration on the trajectory of each of buckets 15a.

Thus, when element 4 rotates in the direction of arrow 17, the buckets 14a carry the fluid from A until A′ on the side Z of the element 4. The fluid leaves buckets 14a of element 4 at A′ and passes into the buckets 15a of the element 5 as indicated by arrow 19 in FIGS. 3 and 4. The kinetic energy of the fluid exerts a pushing force on the vanes 15 of the element 5 which tends to rotate in the direction of the arrow 18. Due to the rotation of the element 5, the fluid which occupies the buckets 15a from B′ down to B on the side Z′ leaves the said buckets at B. The fluid may be retaken at A by the buckets 14a of the element 4. The resistance due to the inertia of the fluid gives rise to a reaction force which is opposed to the rotation of element 4 and its pinion 6 about the planetary axis VW, thus applying a torque on shaft 8 through the ring gear 7. The fluid, during its passage close to the principal axis XY (FIG. 4), leaves the buckets 14a of the element 4 by virtue of the phenomenon of apparent return of the buckets 14a with respect to the axis XY and is propelled into the buckets 15a of the element 5 in the direction of arrow 19, as stated above. The rotation of planetary element 5 about axis VW in the direction of the arrow 18 causes the pinion 9 to roll in the ring gear 10; thus, the kinetic energy of the fluid is transformed into a mechanical energy which drives the planetary assembly 4, 5 and the carrier 2 in the direction of rotation of the input shaft 1; the converter now operates in the recovering phase.

When the output shaft 8 starts to rotate, the ring gear 7 also rotates in the direction of the carrier 2 and the input shaft 1. The rotation of pinion 6 and the element 4 about the planetary axis VW begins to slow down, while the element 5 continues to rotate about axis VW with its starting speed. During the slow-down of the element 4 the phenomena of hydraulic kinetics are comparable to those during starting with the only exception of smaller discharge of the propelled fluid. The volume of this discharge is proportional to the speed of the element 4 about the planetary axis VW, while the kinetic energy of the fluid propelled into buckets 15a of the element 5 is a function of the rotational rate of element 4 about the planetary axis VW.

When the output shaft 8 rotates at the same rate of speed as the input shaft 1, the pinion 6 and the element 4 do not rotate with respect to the planetary axis VW. The element 5, however, continues to rotate under the same conditions as during starting: the converter now operates under direct coupling conditions.

Under direct coupling conditions, since the element 4 no longer rotates about its axis VW, there is no transfer of fluid from the buckets 14a of element 4 to element 5. The phase of recovering having passed, the transmitted torque becomes equal to that of the motor.

The fluid contained in the buckets 14a of element 4 is submitted to a centrifugal force due to the rotation of the planetary assembly about the principal axis XY. This centrifugal force balances the resisting torque applied to axis VW due to its being connected by means of pinion 6 and ring gear 7 to the output shaft 8.

In case the element 5 is connected to the pinion 9 by means of a free wheel, the latter is mounted in such a manner as to transmit the torque in the direction where the element 5 recovers the kinetic energy of the fluid. Thus, during direct coupling, the element 5 will no longer rotate about the planetary axis VW, since it will no longer receive fluid from the element 4.

It is thus seen that the role of the first planetary element 4 is to scoop fluid in that part of the mobile casing 12 where it is confined, to propel it along its trajectory of acceleration while imparting thereto kinetic energy and, by reaction, to apply a mechanical energy to the output shaft to move the same. At the end of the accelerating movement of the element 4 which has given the fluid its kinetic energy, the liquid leaves the buckets 14a of element 4 and is propelled into the buckets 15a of the second planetary element 5 along its trajectory of deceleration. The function of the second planetary element 5 is to receive the fluid exiting from the buckets 14a of the first element 4 and to return it to the outermost part of the mobile element where it is freed. The kinetic energy of the fluid acquired during its propulsion by the first element 4 tends to rotate the second element 5 as soon as it enters its buckets 15a. This element tends to rotate about the planetary axis VW and, supported by the ring gear 10, tends to cause a rotation of the planetary assembly about the principal axis XY thus allowing the unused energy generated by the first element to rotate the output shaft 8 of the converter and to be recovered by the input shaft 1 which is thus submitted to a torque larger than the torque of the motor.

That which is claimed is:
1. A torque converter comprising:
(A) a stationary housing,
(B) an input shaft,
(C) an output shaft, both said shafts extending into said stationary housing and being axially aligned with a main axis of said converter,
(D) at least one orbital shaft fixedly secured to said input shaft in a spaced relation therefrom and adapted to orbit about said main axis when said input shaft is rotated,
(E) a first planetary element mounted on said orbital shaft and rotatable thereabout, said first planetary element including a plurality of first buckets each having an opening,
(F) a second planetary element mounted on said orbital shaft spaced from said first planetary element and rotatable independently thereof about said orbital shaft, said second planetary element including a plurality of second buckets each having an opening, the openings of said first buckets and the openings of said second buckets being disposed in face-to-face relation with respect to one another, (G) a mobile housing surrounding said first and second planetary elements and adapted to orbit about said main axis with said first and second planetary elements when said input shaft is rotated, (H) coupling fluid contained in said mobile housing and operatively interconnecting said first and said second planetary elements, (I) a first means for rotatably interconnecting said first planetary element with said output shaft, said first means including:
  (1) means fixedly secured to said output shaft and rotating therewith as a unit about said main axis,
  (2) means fixedly secured to said first planetary element and rotating therewith as a unit about said orbital shaft, said two last named means being relatively rotatably interconnected, (J) a second means for rotatably interconnecting said second planetary element with said stationary housing, said second means including:
  (1) means fixedly secured to said stationary housing,
  (2) means fixedly secured to said second planetary element and rotating therewith as a unit about said orbital shaft, said two last named being relatively rotatably interconnected, said buckets of said first and said second planetary elements being oriented in such a manner that the buckets of one said planetary element being adapted to carry said fluid from a first zone of said mobile housing to a second zone thereof and to propel fluid in said second zone into the buckets of the other said planetary element imparting thereby mechanical energy to said other planetary element.

2. A torque converter as defined in claim 1, wherein said fluid is a liquid.

3. A torque converter as defined in claim 1, wherein said fluid is a powder.

4. A torque converter as defined in claim 1, wherein said means fixedly secured to said output shaft is a ring gear coaxial with said main axis, said means fixedly secured to said first planetary element is a pinion meshing with said ring gear and adapted to roll thereabout.

5. A torque converter as defined in claim 1, wherein said means fixedly secured to said stationary housing is a ring gear coaxial with said main axis, said means fixedly secured to said second planetary element is a pinion meshing with said ring gear and adapted to roll thereabout.

6. A torque converter as defined in claim 1, wherein at least one of said planetary elements is a disc-shaped member provided with an annular recess open towards the other of said planetary elements, a plurality of inclined vanes radially secured in said recess, said vanes partitioning said recess to define said plurality of said buckets.

7. A torque converter as defined in claim 1 including a sole orbital shaft and a counterweight secured to said input shaft diametrically opposite said first and second planetary elements with respect to said main axis.

References Cited

UNITED STATES PATENTS

| | | | |
|---|---|---|---|
| 2,179,405 | 11/1939 | De Falco | 74—752 |
| 2,692,517 | 10/1954 | O'Hara | 74—752 |
| 3,077,793 | 2/1963 | Cancrinus | 74—752 |
| 3,302,489 | 2/1967 | Cancrinus et al. | 74—752 |

ARTHUR T. McKEON, Primary Examiner